(12) United States Patent
Chen et al.

(10) Patent No.: US 8,480,115 B2
(45) Date of Patent: Jul. 9, 2013

(54) STROLLER

(75) Inventors: Ying-Zhong Chen, Taipei (TW);
Xiao-Long Mo, Taipei (TW)

(73) Assignee: Excellarate Enterprise Co., Ltd.,
Songshan District, Taipei (TW)

( * ) Notice: Subject to any disclaimer, the term of this patent is extended or adjusted under 35 U.S.C. 154(b) by 443 days.

(21) Appl. No.: 12/608,993

(22) Filed: Oct. 29, 2009

(65) Prior Publication Data

US 2010/0109292 A1    May 6, 2010

Related U.S. Application Data

(60) Provisional application No. 61/109,508, filed on Oct. 30, 2008.

(51) Int. Cl.
*B62B 1/00* (2006.01)

(52) U.S. Cl.
USPC ............ 280/643; 280/642; 280/647; 280/648

(58) Field of Classification Search
USPC ............... 280/642, 639, 647, 648, 643, 655.1
See application file for complete search history.

(56) References Cited

U.S. PATENT DOCUMENTS

| | | | | |
|---|---|---|---|---|
| 4,725,071 A * | 2/1988 | Shamie | ........................ | 280/643 |
| 4,834,415 A * | 5/1989 | Yee | ................................ | 280/644 |
| 4,858,947 A * | 8/1989 | Yee et al. | ...................... | 280/643 |
| 5,184,835 A * | 2/1993 | Huang | ..................... | 280/47.371 |
| 5,338,096 A * | 8/1994 | Huang | .......................... | 297/243 |
| 5,417,449 A * | 5/1995 | Shamie | ........................ | 280/642 |
| 5,664,795 A * | 9/1997 | Haung | ....................... | 280/47.38 |
| 5,722,682 A * | 3/1998 | Wang | ............................ | 280/642 |
| 6,086,087 A * | 7/2000 | Yang | ............................. | 280/658 |
| 6,241,273 B1 * | 6/2001 | Gehr | ............................. | 280/642 |
| 6,267,406 B1 * | 7/2001 | Huang | .......................... | 280/647 |
| 6,843,498 B2 | 1/2005 | Bretschger | | |
| 6,935,652 B2 * | 8/2005 | Fair et al. | ...................... | 280/642 |
| 2003/0111878 A1 * | 6/2003 | Cheng et al. | ............. | 297/188.18 |
| 2003/0227157 A1 | 12/2003 | Bretschger | | |
| 2004/0094935 A1 | 5/2004 | Fair | | |
| 2005/0161913 A1 | 7/2005 | Suga | | |
| 2005/0225056 A1 | 10/2005 | Dotsey | | |
| 2005/0258618 A1 | 11/2005 | Kassai | | |

FOREIGN PATENT DOCUMENTS

EP    1 160 145 A1    12/2001

* cited by examiner

*Primary Examiner* — Jeffrey J Restifo
*Assistant Examiner* — James M Dolak
(74) *Attorney, Agent, or Firm* — Winston Hsu; Scott Margo

(57) ABSTRACT

A stroller includes two side frames and a first seat disposed between the side frames. Each side frame includes an armrest, a first leg, a second leg, a handle, and a first link. The first leg and the second leg are pivoted to the armrest, respectively. The handle is pivoted to the armrest, and a bottom end of the handle is detachably engaged with the first leg. A front end of the first link is pivoted to the second leg, and another opposite end is pivoted to the handle. The first seat is movably disposed on the first link. Thus, when the handle rotates between an extended position and a folded position, the first link can bring the first seat and the second leg to rotate relative to the armrest.

14 Claims, 6 Drawing Sheets

STROLLER

CROSS REFERENCE TO RELATED APPLICATIONS

This application claims the benefit of U.S. Provisional Application No. 61/109,508, which was filed on Oct. 30, 2008 and is incorporated herein by reference.

BACKGROUND OF THE INVENTION

1. Field of the Invention

The present invention relates to a stroller, and more specifically, to a stroller utilizing links to fold up a seat, a canopy assembly, and a footrest.

2. Description of the Prior Art

A conventional stroller usually has a folding mechanism for allowing a user to fold up the stroller into a smaller volume. Furthermore, for meeting user needs, many additional mechanisms may be disposed on a stroller so as to make a baby in the stroller feel more comfortably, such as a canopy for sunshade, a rest plate for support of a baby's feet, and so on. However, the aforementioned mechanisms may cause a user great inconvenience in folding of the stroller since these mechanisms are not linked with the folding mechanism. For example, as far as a canopy is concerned, a user needs to fold up the canopy manually at an appropriate angle relative to the stroller before operating the folding mechanism to perform the folding process of the stroller, so as to prevent interference between the canopy and the frame of the stroller. Similarly, since a seat on the stroller does not move correspondingly during the folding process of the stroller, seat components (i.e. a backrest, a footrest, etc.) may also interfere with the folded frame of the stroller easily. Even if the said mechanical interference does not occur during the folding process of the stroller, the canopy and the seat components, which are folded inappropriately, may also protrude outside the collapsed stroller. Thus, the volume of the folded stroller may be increased accordingly so as to cause a user inconvenient to carry.

In summary, how to manufacture a stroller-folding mechanism, which is capable of folding up a canopy, a footrest, and a seat simultaneously, should be a concern in structural design of stroller.

SUMMARY OF THE INVENTION

The present invention provides a stroller comprising a stroller comprising two side frames, each side frame comprising an armrest; a first leg pivoted to the armrest; a second leg pivoted to the armrest; a handle pivoted to armrest, a bottom end of the handle being detachably engaged with the first leg; and a first link having a front end pivoted to the second leg, and a position opposite to the front end pivoted to the handle; and a first seat disposed between the two side frames; wherein the first seat is movably disposed on the first link, so that the first link can bring the first seat and the second leg to rotate relative to the armrest when the handle rotates between a extended position and a folded position.

These and other objectives of the present invention will no doubt become obvious to those of ordinary skill in the art after reading the following detailed description of the preferred embodiment that is illustrated in the various figures and drawings.

DETAILED DESCRIPTION

A folding design provided by the present invention can be applied for two sides of a stroller so as to allow a user to fold the stroller up quickly. In the following, the folding design applied for the right side of the stroller will be described in detail. As for the left side of the stroller according to the present invention, it may utilize a folding design similar to that applied for the right side of the stroller, or may utilize other rotating mechanism suitable for the stroller.

Figure 1:
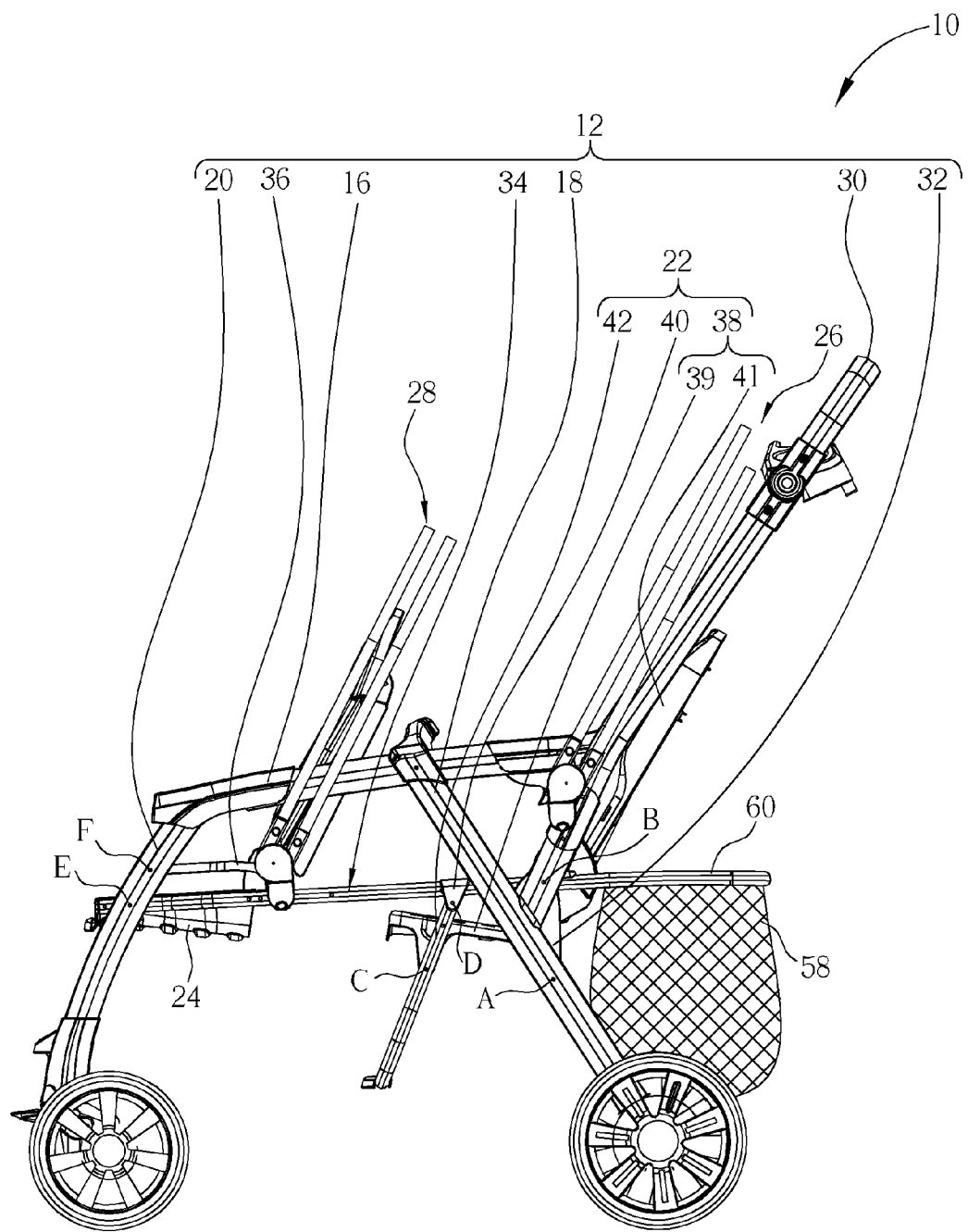
FIG. 1 is a side view of a stroller according to an embodiment of the present invention.

Please refer to FIG. 1, which is a side view of a stroller 10 according to an embodiment of the present invention. The stroller 10 includes two side frames 12 (only one shown in FIG. 1). Each side frame 12 includes an armrest 16, a first leg 18 pivoted to the armrest 16, a second leg 20 pivoted to a front end of the armrest 16, a handle 30 pivoted to a rear end of the armrest 16, a linkage piece 32 disposed at a bottom end of the handle 30, a first link 34, and a second link 36. The first leg 18 and the second leg 20 are both pivoted to the armrest 16. One end of the linkage piece 32 is pivoted to the first leg 18 at a pivot point A shown in FIG. 1. The first link 34 is pivoted to the handle 30 and the other end of the linkage piece 32 at a pivot point B shown in FIG. 1. The stroller 10 further includes a first seat 22 and a second seat 24, which are disposed between the two side frames 12. As shown in FIG. 1, the first seat 22 is disposed at a rear end of the side frame 12, and the second seat 24 is disposed at a front end of the side frame 12. The first seat 22 includes a seat body 38, a connecting piece 40, and a footrest 42. The seat body 38 includes a seat unit 39 and a backrest 41 pivoted to the seat unit 39. The backrest 41 is also pivoted to the handle 30 so that the backrest 41 is capable of rotating relative to the seat unit 39 while the handle 30 is rotating. The connecting piece 40 is movably disposed on the first link 34, and the footrest 42 is pivoted to the seat unit 39 at a pivot point C and is pivoted to the connecting piece 40 at a pivot point D respectively. In this embodiment, the footrest 42 is preferably a U-shaped pipe for support of a baby's feet. Two ends of the footrest 42 are pivoted to the connecting piece 40 that is sleeved on the first link 34 at two sides of the stroller 10 at the pivot points D, respectively. The footrest 42 is pivoted to the seat unit 39 at the pivot point C that is located under the two ends of the footrest 42. As for the second seat 24, the structure of which is similar to that of the first seat 22, it is fixed to the first link 34 at the position near a front end of the first link 34. In this embodiment, the second seat 24 may have the same structural design as that of the first seat 22, or may be a conventional stroller seat. As for which design is utilized, it depends on practical applications of the stroller 10.

Figure 2:
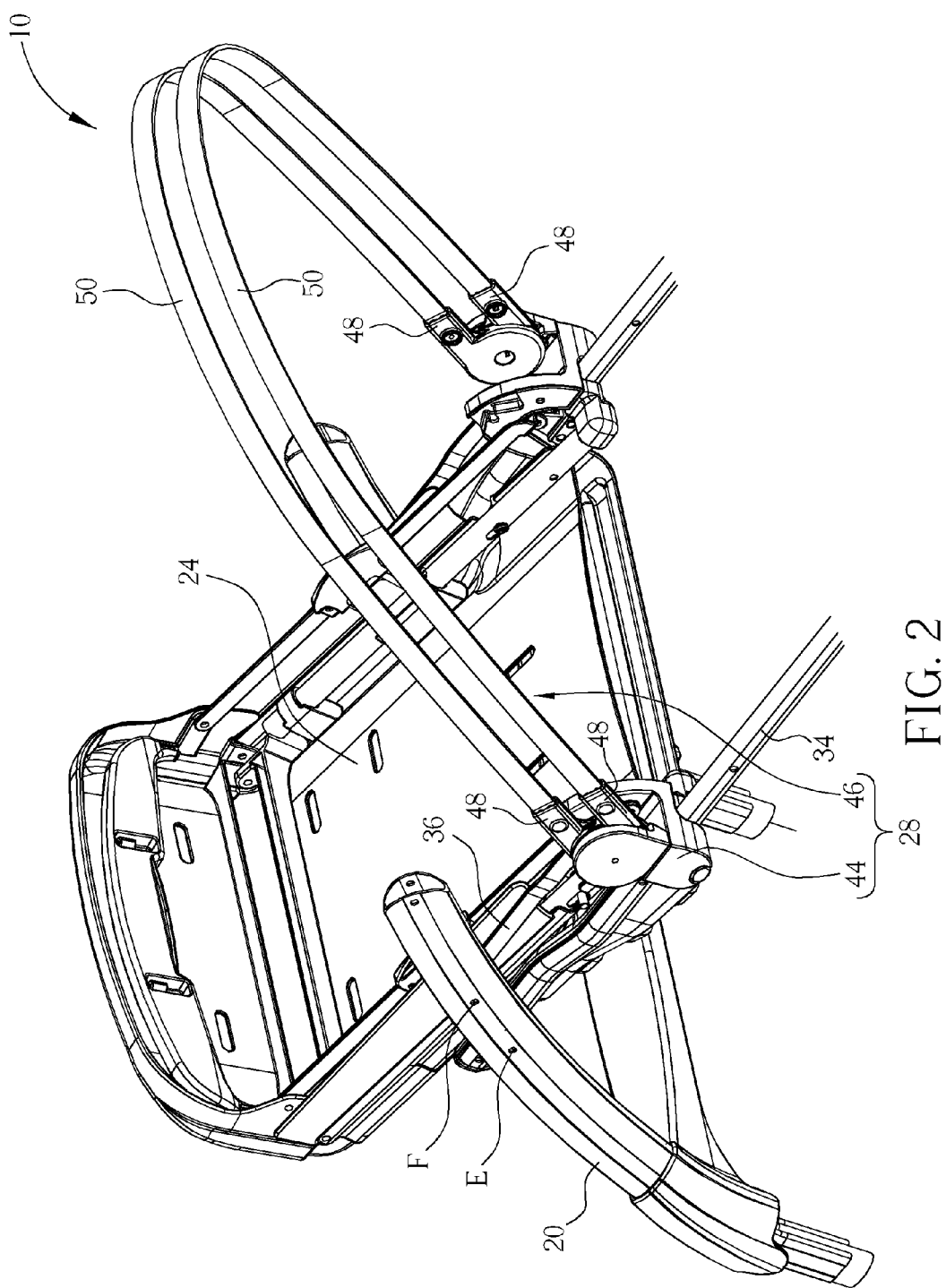
FIG. 2 is a diagram of the second canopy assembly in FIG. 1 being installed on the first link.

As shown in FIG. 1, the stroller 10 further includes a first canopy assembly 26 and a second canopy assembly 28, which are disposed between the two side frames 12 and are located above the first seat 22 and the second seat 24, respectively. Next, please refer to FIG. 1 and FIG. 2. FIG. 2 is a diagram of the second canopy assembly 28 in FIG. 1 being installed on the first link 34. As shown in FIG. 2, the front end of the first link 34 is pivoted to the second leg 20 at a pivot point E, and the handle 30 is pivoted to the first link 34 at a position opposite to the front end of the first link 34. A front portion of the first link 34 is worked as a seat pipe for supporting the second seat 24. The second canopy assembly 28 is pivoted to the first link 34 at a position corresponding to the second seat 24. The second link 36 is disposed above the first link 34. A front end of the second link 36 is pivoted to the second leg 20 at a pivot point F, and a rear end of the second link 36 is pivoted to the second canopy assembly 28. As shown in FIG. 2, as far as one end of the second canopy assembly 28 (the other end may be deduced by analogy) is concerned, the second canopy assembly 28 includes a base 44 and a canopy device 46 pivoted to the base 44. The base 44 is pivoted to the first link 34 and the second link 36. In the present invention, the canopy device 46 may be a conventional canopy structure disposed on a stroller. For example, the canopy device 46 may includes two canopy rods 50 and pivoting parts 48 fixed to two ends of each canopy rod 50. Each pivoting part 48 is pivoted to the corresponding base 44 and each canopy rod 50 is connected to the corresponding pivoting part 48, so that the two canopy rods 50 are capable of rotating relative to the base 44. Finally, after mounting a canopy softgoods between the two canopy rods 50, the assembly process of the canopy device 46 is finished. In such a manner, via rotation of the two canopy rods 50 relative to the base 44, the canopy softgoods may be extended to shelter the second seat 24 from sunshine or noise. Furthermore, as shown in FIG. 2, when the second leg 20 rotates relative to the armrest 16, the second canopy assembly 28 will be brought to rotate relative to the first link 34 following the moving of the second link 36 since the second canopy assembly 28 is pivoted to the first link 34 and the second link 36.

As for the first canopy assembly 26, its structural design is similar to that of the second canopy assembly 28 in this embodiment (as shown in FIG. 1). Since the first canopy assembly 26 is disposed on the handle 30, the first canopy assembly 26 will rotate with the handle 30 when the handle 30 rotates relative to the first link 34.

As shown in FIG. 1, the handle 30 is pivoted to the armrest 16, and as mentioned above, two ends of the linkage piece 32 are pivoted to the bottom end of the handle 30 at the pivot point B and the first leg 18 at the pivot point A, respectively. Thus, the linkage piece 32 can rotate relative to the handle 30 and the first leg 18 when the handle 30 rotates relative to the armrest 16, so that the first leg 18 can rotate relative to the armrest 16 accordingly. Furthermore, as mentioned above, the first link 34, the handle 30, and the linkage piece 32 are pivoted at the pivot point B, and one end of the first link 34 is pivoted to the second leg 20. As a result, the first link 34 can bring the first seat 22 to move and the second leg 20 to rotate relative to the armrest 16 at the same time when the handle 30 rotates relative to the armrest 16. On the other hand, since two ends of the second link 36 are pivoted to the second leg 20 and the base 44 of the second canopy assembly 28, respectively, the second link 36 can drive the base 44 to rotate relative to the first link 34 when the second leg 20 rotates relative to the armrest 16. That is to say, when the second leg 20 rotates relative to the armrest 16, the second canopy assembly 28 can be driven to rotate relative to the first link 34 by the second link 36 correspondingly.

Figure 3:
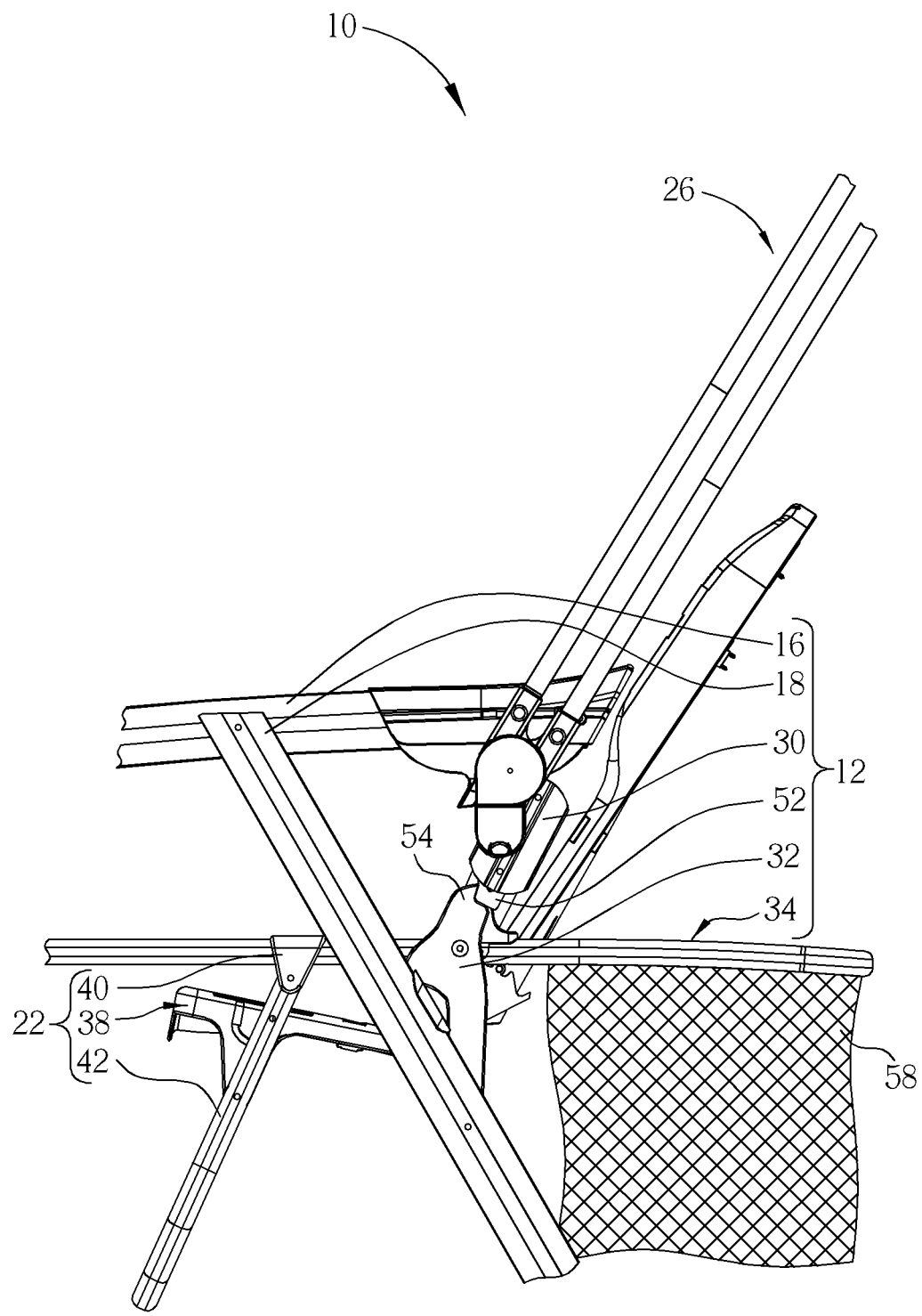
FIG. 3 is a diagram of the handle in FIG. 1 being located at an extended position relative to the armrest.

More detailed description for the folding process of the stroller 10 is provided as follows. Please refer to FIG. 1 and FIG. 3. FIG. 3 is a diagram of the partly handle 30 in FIG. 1 being positioned at an extended position relative to the armrest 16. When the stroller 10 is in an extended state, the bottom end of the first leg 18 is away from the bottom end of the second leg 20 (as shown in FIG. 1). As shown in FIG. 3, the side frame 12 further includes an engaging piece 52. The engaging piece 52 is slidably disposed on the handle 30 and is used for engaging with the linkage piece 32. The engaging piece 52 may have a spring disposed thereon for biasing the engaging piece 52 toward engaging with the linkage piece 32. As for the mechanism for controlling the engaging piece 52 on the handle 30 to be engaged with or disengaged from the linkage piece 32, it may be a button-type mechanism or other conventional mechanism. The said controlling mechanism usually involves disposing an operating part on the handle 30 for operating the motion of the engaging piece 52 by a linking device connected to the engaging piece 52. The related description for structural design of the said mechanism is omitted herein since it is commonly seen in the prior art. Next, as shown in FIG. 3, when the stroller 10 is in the extended state, the engaging piece 52 is engaged with a first engaging structure 54 of the linkage piece 32, so that the handle 30, the first leg 18, and the second leg 20 can be positioned firmly. That is to say, via engagement between the engaging piece 52 and the first engaging structure 54 of the linkage piece 32, the stroller 10 can remain in the extended state and usable for carrying a baby.

Figure 4:
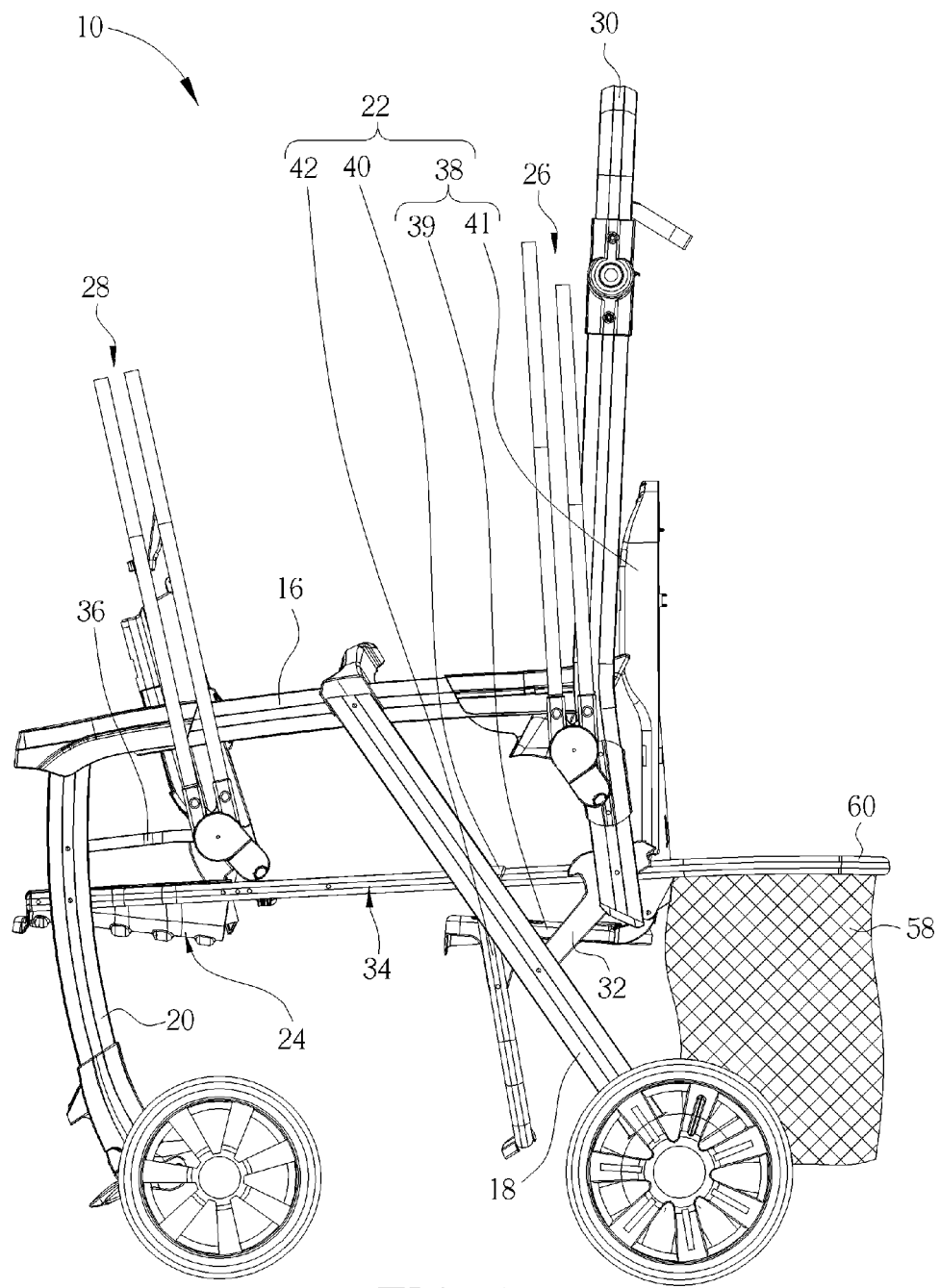
FIG. 4 is a diagram of the stroller in FIG. 1 being in a half-folded state.
Figure 5:
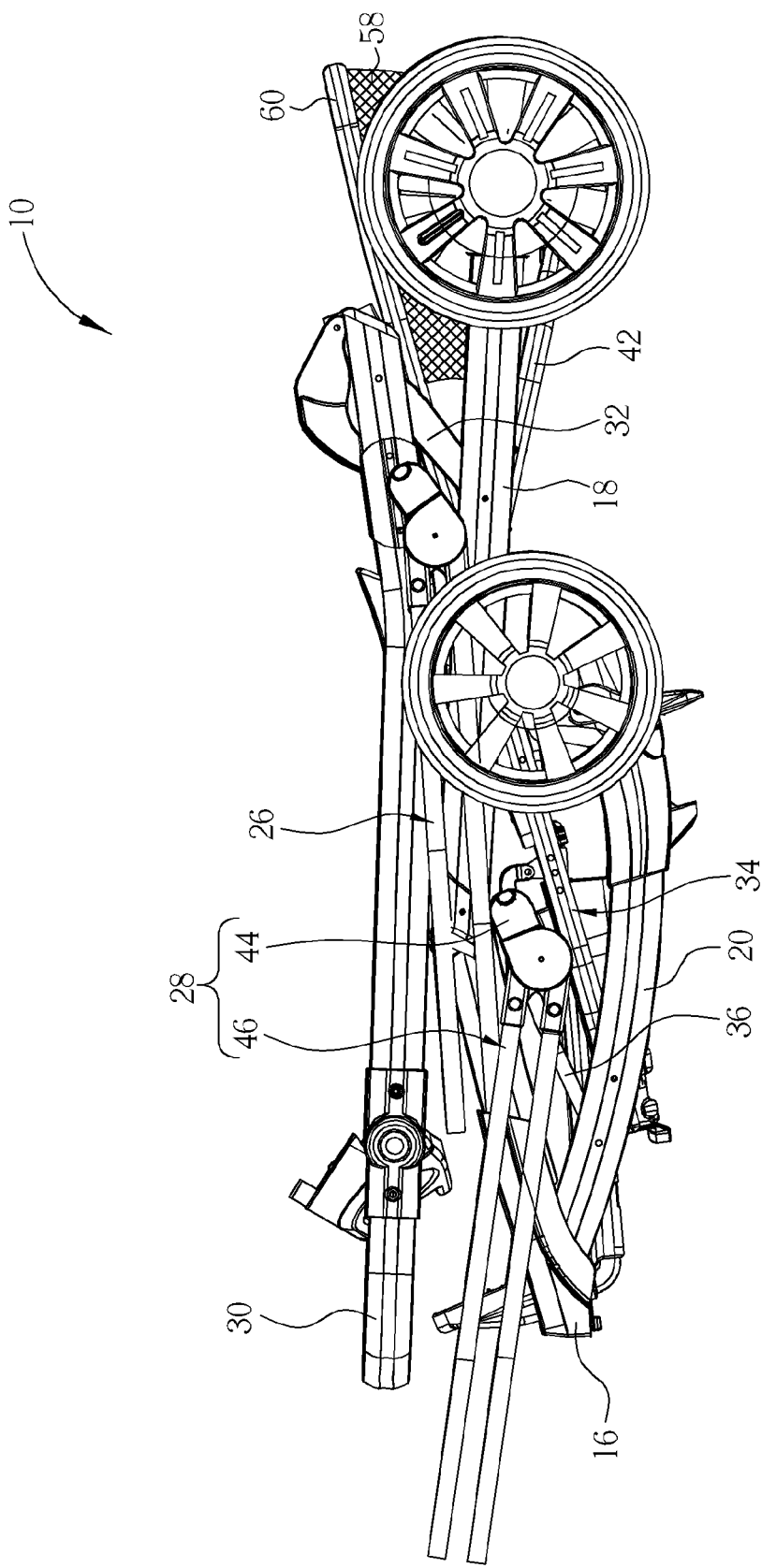
FIG. 5 is a diagram of the stroller in FIG. 1 being in a folded state.

Next, please refer to FIG. 1, FIG. 3, FIG. 4, and FIG. 5. FIG. 4 is a diagram of the stroller 10 in FIG. 1 being in a half-folded state. FIG. 5 is a diagram of the stroller 10 in FIG. 1 being in a folded state. When a user wants to fold up the stroller 10 in FIG. 1, the user needs to press the aforementioned operating part for controlling the engaging piece 52 to be disengaged from the first engaging structure 54 of the linkage piece 32 (at this time, the spring disposed on the engaging piece 52 is in a compressed state), so that the handle 30 can rotate relative to the armrest 16 and move toward the armrest 16. Subsequently, the user needs to push the handle 30 as shown in FIG. 1 to rotate counterclockwise relative to the armrest 16 (as shown in FIG. 4). At this time, since the handle 30 will bring the backrest 41 to rotate together, the first link 34 can accordingly drive the seat unit 39 of the seat body 38 to move backward, and the linkage piece 32 can rotate relative to the handle 30 and the first leg 18, the footrest 42 can correspondingly take the connecting piece 40 as a pivot point to rotate counterclockwise with motion of the seat unit 39 through linkages on the pivot points A, B, C, and D, until the handle 30 rotates to the folded position relative to the armrest 16 (as shown in FIG. 5). During the said folding process, the connecting piece 40 can slide forward on the first link 34 simultaneously. In such a manner, with rotation of the handle 30 relative to the armrest 16, the footrest 42 can move toward the first leg 18 while rotating from a position as shown in FIG. 3 to a position as shown in FIG. 4 relative to the seat unit 39, and then be positioned at a position as shown in FIG. 5. In other words, when the user pushes the handle 30 to fold up the stroller 10, the seat body 38 can rotate the footrest 42 to the position close to the handle 30 and the first leg 18 (as shown in FIG. 5), so as to prevent the footrest 42 from protruding outside the folded stroller 10 for reducing the volume of the folded stroller 10.

On the other hand, since the first link 34 moves backward and the armrest 16 moves forward with rotation of the handle 30, the second leg 20 can rotate counterclockwise toward the first leg 18 through linkages on the pivot points E and F as shown in FIG. 1 and FIG. 2. When the second leg 20 is rotating, the second link 36 can move forward accordingly to drive the base 44 of the second canopy assembly 28 to rotate relative to the first link 34 until the handle 30 rotates to the folded position relative to the armrest 16. In such a manner, with rotation of the handle 30 relative to the armrest 16, the second canopy assembly 28 can move toward the armrest 16 and the second leg 20 while rotating relative to the first link 34, and then be positioned at the position as shown in FIG. 5. In other words, when the user pushes the handle 30 to fold up the stroller 10, the second link 36 can rotate the second canopy assembly 28 to a position substantially-parallel to the folded stroller 10 (as shown in FIG. 5), so as to prevent the second canopy assembly 28 from interfering with other components of the stroller 10. As for the first canopy assembly 26, when the handle 30 rotates counterclockwise relative to the armrest 16, it can move toward the armrest 16 and the first leg 18 together with the handle 30 and then rotate to a position as shown in FIG. 5 accordingly since it is disposed on the handle 30.

In summary, when the user wants to fold up the stroller 10 as shown in FIG. 1, the user just needs to push the handle 30 in FIG. 1 to rotate counterclockwise relative to the armrest 16 after the engaging piece 52 is disengaged from the first engaging structure 54 of the linkage piece 32. At this time, via linkage between the second canopy assembly 28 and the second link 36 and linkage between the footrest 42 and the seat unit 39, the stroller 10 can rotate the second canopy assembly 28 and the footrest 42 to move toward the armrest 16, the first leg 18, and the second leg 20 (as shown in FIG. 5). Simultaneously, the first canopy assembly 26 and the backrest 41 can also move toward the armrest 16 and then rotate to the position as shown in FIG. 5 with rotation of the handle 30. Thus, the volume of the folded stroller 10 can be reduced accordingly so as to increase convenience in disposal of the folded stroller 10.

Figure 6:
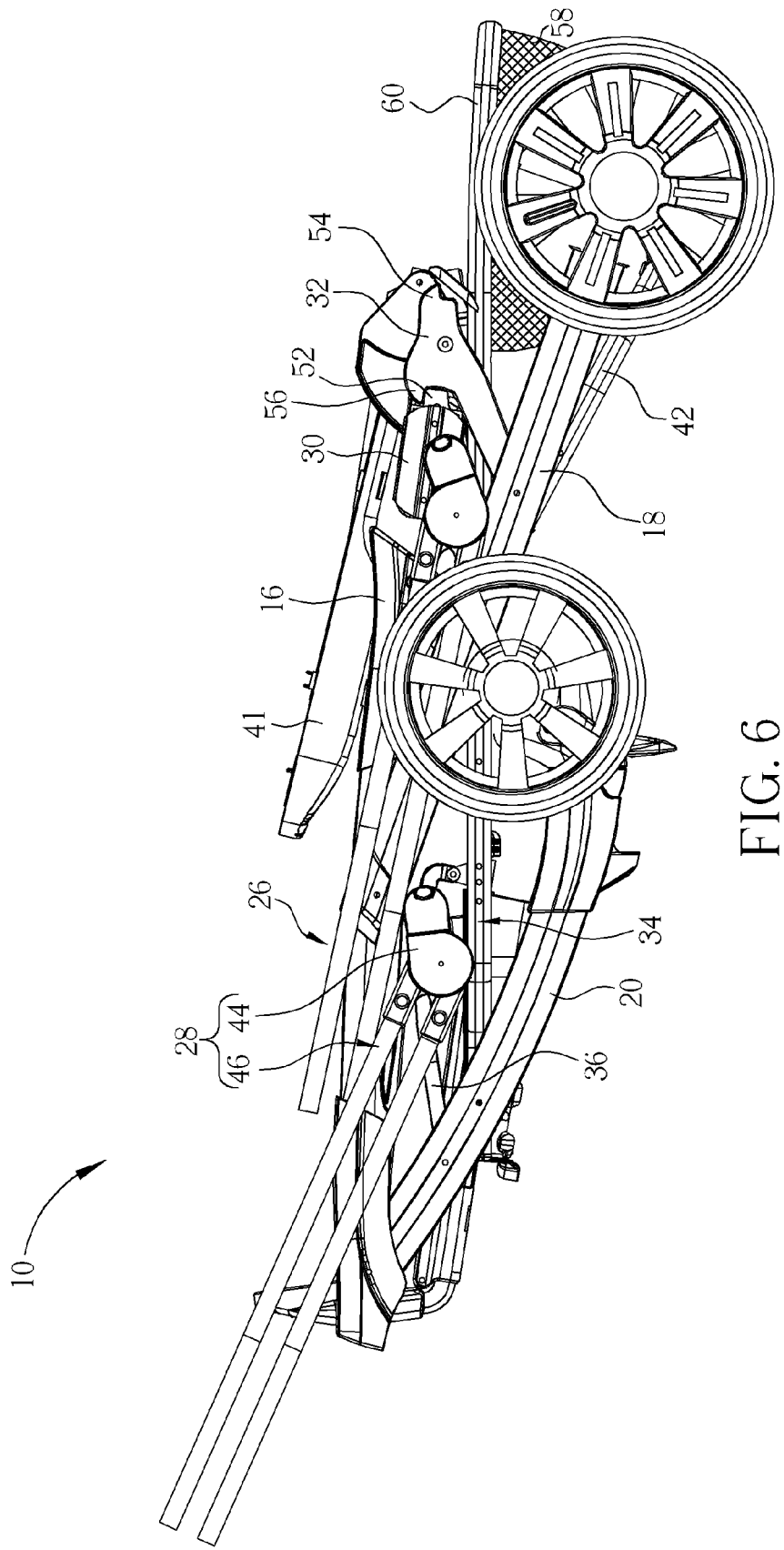
FIG. 6 is a diagram of the engaging piece in FIG. 3 being engaged with the second engaging structure of the linkage piece.

Furthermore, after the handle 30 rotates to the folded position relative to the armrest 16, the engaging piece 52 can be engaged with a second engaging structure 56 of the linkage piece 32 by elastic force provided from the said compressed spring, so that the handle 30 can be retained at the folded position. The related engagement can be shown in FIG. 6, which is a diagram of the engaging piece 52 in FIG. 3 being engaged with the second engaging structure 56 of the linkage piece 32. In other words, via engagement of the engaging piece 52 and the second engaging structure 56 of the linkage piece 32, the stroller 10 can be retained in the folded state. In this embodiment, the first engaging structure 54 and the second engaging structure 56 are both a recess. Furthermore, engagement design of the stroller 10 is not limited to the said embodiment, meaning that the stroller 10 can also utilize other engagement design commonly used in the prior art. For example, the stroller 10 can include an engaging piece that has a recess secured on the first leg 18 instead of the linkage piece 32 for directly engaging with the engaging piece 52.

Next, if the user wants to unfold the stroller 10 in FIG. 5, the user just needs to pull the handle 30 to rotate clockwise relative to the armrest 16 after the engaging piece 52 is disengaged from the second engaging structure 56 of the linkage piece 32 (at this time, the spring in the engaging piece 52 is compressed). At this time, with clockwise rotation of the handle 30 relative to the armrest 16, the first link 34 drives the seat unit 39 to move forward and the linkage piece 32 rotates relative to the handle 30 and the first leg 18 correspondingly. Therefore, the footrest 42 can take the connecting piece 40 as a pivot point to rotate clockwise with motion of the seat unit 39 until the handle 30 rotates to the extended position as shown in FIG. 1 (at this time, the bottom end of the first leg 18 and the bottom end of the second leg 20 are positioned away from each other). At the same time, the connecting piece 40 slides backward on the first link 34 correspondingly. In such a manner, with clockwise rotation of the handle 30 relative to the armrest 16, the footrest 42 can rotate to the position as shown in FIG. 1 relative to the seat unit 39, and the backrest 41 can rotate back to the position as shown in FIG. 1. On the other hand, since the first link 34 moves forward and the armrest 16 moves backward with clockwise rotation of the handle 30, the second leg 20 can correspondingly rotate clockwise. When the second leg 20 is rotating clockwise, the second link 36 can move backward correspondingly. As a result, the base 44 can rotate relative to the first link 34 until the handle 30 rotates to the extended position as shown in FIG. 1 relative to the armrest 16. In such a manner, the second canopy assembly 28 can rotate back to the position as shown in FIG. 1 relative to the first link 34. As for the first canopy assembly 26, it can directly rotate to the position as shown in FIG. 1 together with the handle 30 since it is disposed on the handle 30. Furthermore, other components on the stroller 10 can also move back to the position as shown in FIG. 1 with clockwise rotation of the handle 30. In summary, via the process of pulling the handle 30 in FIG. 5 to rotate clockwise relative to the armrest 16, the user can extend the stroller 10 from the folded state as shown in FIG. 5 to the half-folded state as shown in FIG. 4 and then back to the extended state as shown in FIG. 1. At this time, the engaging piece 52 can be engaged with the first engaging structure 54 of the linkage piece 32 (as shown in FIG. 3) by elastic force provided from the said spring, so as to cause the handle 30 to be retained at the extended position. That is to say, via engagement of the engaging piece 52 and the first engaging structure 54, the stroller 10 can keep in the extended state and usable for carrying a baby.

It should be mentioned that the stroller 10 further includes a storage device 58 as shown in FIG. 1. The storage device 58 is disposed on an extended section 60 of the first link 34. As shown in FIG. 1, the extended section 60 is formed at the first link 34 that is protruded backward from the handle 30. In the embodiment, the storage device 58 is a mesh cloth. In such a manner, the stroller 10 can utilize the storage device 58 to provide a user with a space for storing goods (e.g. baby supplies).

Furthermore, the aforementioned linkage design can not be only applied for a stroller with two seats, but also be applied for a stroller with one single seat. For example, the aforementioned linkage design may also be applied for a stroller which only has a first seat 22 and a first canopy assembly 26 disposed thereon without the second seat 24 and the second canopy assembly 28. In this case, via rotation of the handle 30 relative to the armrest 16 and linkage of the seat unit 39 and the footrest 42, the first seat 22 and the first canopy assembly 26 can also be rotated to a substantially mutually-parallel position relative to the first leg 18 and the second leg 20. Other structural variations may be deduced by analogy, and related description is therefore omitted herein. In summary, the linkage designs mentioned in the present invention can be applied for a stroller with multiple seats or a stroller with one single seat.

As mentioned above, in the prior art, not only a canopy assembly, a footrest and a stroller frame may interfere with each other when a user folds up a stroller, but the canopy assembly and the footrest, which are folded inappropriately, may also protrude outside the folded stroller. Compared with the prior art, the present invention involves utilizing linkage of the canopy assembly and the link and linkage of the footrest and the seat, which are mentioned in the said embodiment, to rotate the canopy assembly and the seat (including the footrest disposed thereon) to a mutually-parallel position relative to the folded stroller, so as to solve the said problems. In such a manner, not only the volume of the folded stroller may be reduced accordingly so as to make disposal of the folded stroller easier, but the folding process of the stroller may also be finished quickly and easily through simple operations so as to increase convenience in use of the stroller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   two side frames, each side frame comprising:
     an armrest;
     a first leg pivoted to the armrest;
     a second leg pivoted to the armrest;
     a handle pivoted to the armrest, a bottom end of the handle being detachably engaged with the first leg; and
     a first link having a front end pivoted to the second leg, and a position opposite to the front end pivoted to the handle; and
   a first seat disposed between the two side frames and movably disposed on the first link, the first seat comprising:
     a seat body comprising:
       a seat unit, wherein the first link is located between the armrest and the seat unit; and
       a backrest pivoted to the seat unit and the handle;
     wherein when the handle rotates between an extended position and a folded position, the first link brings the second leg to rotate relative to the armrest and the seat unit moves relative to the first link.

2. The stroller of claim 1, wherein the first seat further comprises:
   a connecting piece movably disposed on the first link; and
   a footrest pivoted to the seat unit and the connecting piece for rotating relative to the connecting piece when the seat unit moves relative to the first link.

3. The stroller of claim 2, wherein the footrest is a U-shaped pipe, and two ends of the footrest are pivoted to the connecting pieces, respectively.

4. The stroller of claim 1, wherein each side frame comprises a linkage piece, two ends of the linkage piece are pivoted to the handle and the first leg respectively, the linkage piece rotates relative to the handle and the first leg respectively when the handle rotates between the extended position and the folded position, a first engaging structure and a second engaging structure are formed on the linkage piece, each side frame further comprises an engaging piece movably disposed on the handle, and the engaging piece is engaged with the first engaging structure when the handle is located at the extended position relative to the armrest and is engaged with the second engaging structure when the handle is located at the folded position.

5. The stroller of claim 1, wherein the stroller further comprises a canopy assembly pivoted to the first link of the side frame, each side frame comprises a second link, two ends of the second link are pivoted to the second leg and the canopy assembly respectively, and the second link drives the canopy assembly to rotate relative to the first link when the second leg rotates relative to the armrest.

6. The stroller of claim 5, wherein the canopy assembly comprises:
   a base connected to the first link and the second link; and
   a canopy device pivoted to the base;
   wherein the second link drives the base to rotate relative to the first link when the second leg rotates relative to the armrest.

7. The stroller of claim 6, wherein the canopy device comprises two pivoting parts and two canopy rods, the two pivoting parts are pivoted to the base, and the two canopy rods are connected to the two pivoting parts respectively so that the two canopy rods can rotate relative to the base.

8. The stroller of claim 1, wherein the stroller further comprises a second seat disposed between the two side frames, and each side of the second seat is fixed to the first link at a position near a front end of the first link.

9. The stroller of claim 8, wherein the stroller further comprises a canopy assembly pivoted to the first link of the side frame, each side frame comprises a second link, two ends of the second link are pivoted to the second leg and the canopy assembly respectively, and the second link drives the canopy assembly to rotate relative to the first link when the second leg rotates relative to the armrest.

10. The stroller of claim 9, wherein the canopy assembly is pivoted at a position on the first link corresponding to the second seat.

11. The stroller of claim 10, wherein the canopy assembly comprises:
    a base connected to the first link and the second link; and
    a canopy device pivoted to the base.

12. The stroller of claim 11, wherein the canopy device comprises two pivoting parts and two canopy rods, the two pivoting parts are pivoted to the base, and the two canopy rods are connected to the two pivoting parts respectively so that the two canopy rods can rotate relative to the base.

13. The stroller of claim 1 further comprising a storage device disposed on an extended section of first link.

14. The stroller of claim 2 further comprising a storage device disposed on an extended section of first link.

* * * * *

UNITED STATES PATENT AND TRADEMARK OFFICE
CERTIFICATE OF CORRECTION

| | | |
|---|---|---|
| PATENT NO. | : 8,480,115 B2 | Page 1 of 1 |
| APPLICATION NO. | : 12/608993 | |
| DATED | : July 9, 2013 | |
| INVENTOR(S) | : Ying-Zhong Chen et al. | |

It is certified that error appears in the above-identified patent and that said Letters Patent is hereby corrected as shown below:

On the title page, item (73), correct the name of the assignee from "EXCELLARATE ENTERPRISE CO., LTD." to --EXCELLERATE ENTERPRISE CO., LTD.--.

Signed and Sealed this
Eighth Day of October, 2013

Teresa Stanek Rea
*Deputy Director of the United States Patent and Trademark Office*